March 5, 1963   A. E. BROOKES   3,079,925
MACHINE FOR PLUCKING HOPS OR LIKE PLANTS
Filed April 1, 1960
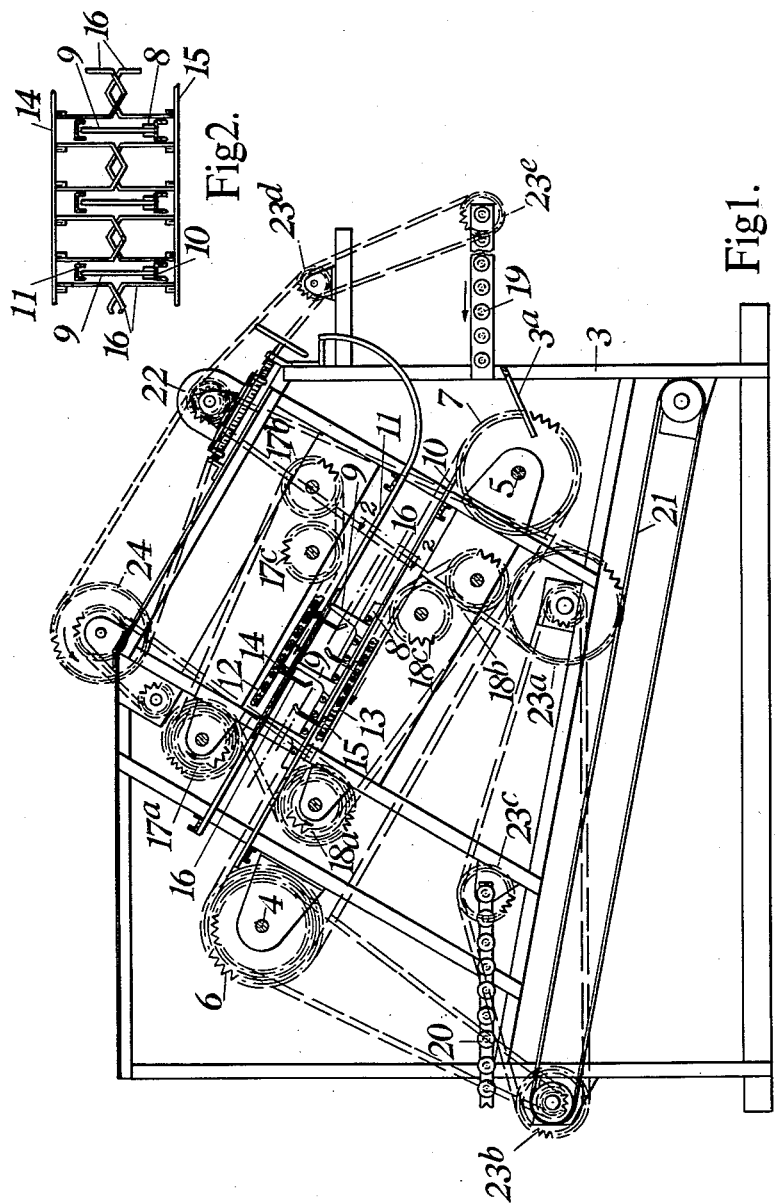
Inventor
A. E. Brookes United States Patent Office 3,079,925
Patented Mar. 5, 1963

3,079,925
MACHINE FOR PLUCKING HOPS
OR LIKE PLANTS
Albert Edward Brookes, Bush Bank, Suckley, England
Filed Apr. 1, 1960, Ser. No. 19,374
2 Claims. (Cl. 130—30)

The object of this invention is to provide a convenient machine more particularly for plucking hop flowers from their bines, but also usable for analogous purposes, such, for example, as the plucking of beans from their bines, or for separating seeds from herbs and the like.

A machine according to the invention comprises in combination a plurality of endless conveyor chains each incorporating a plurality of spaced and outwardly extending conveyor fingers, means supporting complementary runs of the plurality of conveyor chains for traverse through substantially straight parallel paths, a plurality of fixed parallel channels within which the outer ends of the conveyor fingers are adapted to engage during movement along said substantially straight paths, and a plurality of endless plucking chains each having a substantially straight run extending parallel to the straight runs of the conveyor chains, said plucking chains having outwardly extending plucking fingers adapted to pass between the conveyor fingers, and being adapted to be driven at a speed such that the plucking fingers on the straight run will move in the same direction as, but at a greater speed than the conveyor fingers.

In the accompanying drawings FIGURE 1 is a part sectional side view illustrating one example of the invention, whilst FIGURE 2 is a section on the line 2—2 in FIGURE 1.

Referring to the drawing there is provided a frame 3 on which are mounted a pair of shafts 4, 5. On each of these shafts is mounted a plurality of axially spaced and similar sprocket wheels one pair of which is shown at 6, 7 respectively, and around complementary pairs of sprocket wheels 6, 7 respectively extend a plurality of endless conveyor chains 8. Each chain 8 incorporates a plurality of longitudinally spaced and outwardly extending rigid fingers 9. Moreover, the shafts 4, 5 are so arranged that the upper and lower runs of the chains 8 are inclined and extend parallel with one another.

Extending below the upper run of each chain 8 is a guide 10 which serves to support this run for traverse through a substantially straight path. The plurality of guides 10 extend parallel with one another and serve as tracks with which the rollers of the chains 8 co-operate. Also, there are provided on the frame 3 a plurality of fixed parallel channels 11 which are equi-spaced from the plurality of guides 10 respectively, the arrangement being such that the fingers 9 extending from the upper runs of the chains 8 are slidably engaged within the channels 11 respectively.

There is also provided two pairs of endless plucking chains 12, 13 which pass around sprocket wheels on parallel shafts on the frame in a manner to be described and are disposed above and below the substantially straight paths of the chains 8 respectively, thereby defining upper and lower sets of plucking chains. Moreover, along the straight paths of the plurality of chains 8 each set of chains 12, 13 extends parallel with and spaced from the outermost chains 8. At equi-spaced intervals there are attached to the upper and lower sets of chains 12, 13 pluralities of bars 14, 15 respectively which extend at right angles to the chains 12, 13. To each of the bars 14, 15 is detachably clamped a plurality of plucking fingers 16 which may take the form of resilient wire loops, or straight springs, or both and the arrangement is such that along the straight path the fingers 16 pass between the fingers 9.

The chains 12, 13 are adapted to be driven at such a speed that the fingers 16 move on the straight run in the same direction as, but at a greater speed than, the fingers 9, and thereby pluck flowers from bines extending transversely across the upper runs of the chains 8 between the fingers 9.

In order that the fingers 16 shall extend outwardly during the straight path, the set of chains 12 conveniently extend around three sets of sprocket wheels $17^a$, $17^b$, $17^c$ mounted on three parallel shafts above the chain 8 respectively, whilst the chains 13 may be similarly mounted on sprocket wheels $18^a$, $18^b$, $18^c$ below the chain 8. The arrangement is such that each plucking chain passes around either the sprocket wheels $17^b$, $17^c$ or the sprocket wheels $18^b$, $18^c$ on its approach to the straight run so that it changes direction through only a small angle as it enters the straight run. The reason for this is that when the fingers 16 pass around a sprocket wheel the outer ends of the fingers have a high linear velocity imparted to them than do their inner ends. The initial effect of this is to cause the fingers 16 to bend backwards against their resiliency, whereafter their resilience causes them to flex forwardly relative to the respective bars 14, 15 before finally regaining equilibrium. It is undesirable for the fingers 16 to be moving forwardly relative to their points of connection with their respective chains whilst in contact with the bines, and by the use of three sprocket wheels for each chain arranged as described this effect is minimized.

A feed conveyor 19 is mounted on the frame 3 at the lower end of the chain 8, to which it is adapted to feed bines or the like so as to lie transversely between the fingers 9. The bines are initially prevented from falling under gravity by a comb $3^a$ on the frame, and are subsequently fed through the straight path, where the flowers are plucked from them. On reaching the upper end of the chain 8, the bines fall onto a delivery conveyor 20, which is conveniently mounted at the same level as the conveyor 19 and may be used to feed the bines to a further machine similar to the one described. The flowers plucked from the bine fall between the chains 8, 13 for collection by any convenient means such as a conveyor 21.

An electric motor 22 is provided on the frame for driving the conveyor chains 8 and the conveyors 19, 20, 21 through reduction gear in the form of pulleys $23^a$, $23^b$, $23^c$, $23^d$, and $23^e$. Moreover, both sets of plucking chains 12, 13 are driven from the motor 22 through a variable speed pulley 24 or other variable speed gear whereby their speed may be adjusted to any desired value in excess of the speed of the chains 8 to determine the speed of the fingers 16 relative to the bines. The directions of rotation of the various pulleys and sprocket wheels are illustrated by arrows in the drawings.

Having thus described my invention what I claim as new and desire to secure by Letters Patent is:

1. A machine for plucking hop flowers or other parts from bines or other plants, comprising in combination a supporting frame, two pairs of parallel and rotatable shafts mounted on the frame, a plurality of sprocket wheels secured in axially spaced positions on each of the shafts, a plurality of endless conveyor chains which extend between, and are in operative engagement with, the sprocket wheels on one of the pairs of shafts, and which have corresponding straight runs whereby the plants, from which parts are required to be plucked, can be carried in transverse relationship with the conveyor chains, a plurality of elongated guides which are secured to the frame in parallel relationship with the straight runs of the conveyor chains, and which support the said straight runs for enabling them to move through substantially straight and parallel paths, a set of endless plucking chains which extend between, and operatively engage, the sprocket wheels on the other pair of shafts, and which have straight runs parallel with, and spaced from, the said straight runs of the conveyor chains, driving means operatively connected to one shaft of each pair so that, when the driving means are in action the said straight runs of the plucking chains move in the same direction as, but at a greater speed than, the said straight runs of the conveyor chains, a plurality of plucking fingers attached to, and extending upwardly from, the plucking chains at longitudinally spaced positions, a plurality of conveyor fingers attached to, and extending outwardly from, the conveyor chains at longitudinally spaced positions, and arranged so that the plucking fingers on each plucking chain are movable between the conveyor fingers on the adjacent conveyor chains, a plurality of rigid channels which are secured to the frame in parallel relationship with, and spaced from, the straight runs of the conveyor chains, and with which the outer ends of the said conveyor fingers are in slidable engagement during movement along the said straight and parallel paths, a third pair of rotatable shafts mounted on the frame in parallel relationship with the first mentioned pair of shafts, a plurality of sprocket wheels secured in axially spaced positions on each of the third pair of shafts, and another set of endless plucking chains which extend between and operatively engage, the sprocket wheels on the third pair of shafts, and which have straight runs parallel with, and spaced from, the said straight runs of the conveyor chains, the two sets of plucking chains being disposed at opposite sides of the elongated guides, and one of the third pair of shafts being operatively connected to the driving means so that, when the driving means are in action, the said straight runs of the second set of plucking chains move in the same direction, and at the same speed, as the straight runs of the first mentioned set of plucking chains.

2. A machine according to claim 1, and having in combination a fourth pair of rotable shafts mounted on the frame in parallel relationship with the other shafts, and a plurality of sprocket wheels secured in axially spaced positions on each of the fourth pair of the shafts, the sprocket wheels on one of the fourth pair of shafts being in operative engagement respectively with the plucking chains of one set, the sprocket wheels on the other of the fourth pair of shafts being in operative engagement respectively with the plucking chains of the other set, and the fourth pair of shafts being disposed so that, when the driving means are in action, the portions of the plucking chains approaching the said straight runs thereof are at a small angle thereto.

References Cited in the file of this patent
UNITED STATES PATENTS

| | | |
|---|---|---|
| 1,426,498 | Owen | Aug. 22, 1922 |
| 1,662,467 | Minshall | Mar. 13, 1928 |
| 2,905,183 | Thurmer | Sept. 22, 1959 |